(12) United States Patent
Hamachi

(10) Patent No.: US 10,701,050 B2
(45) Date of Patent: Jun. 30, 2020

(54) BASE STATION, CONTROL METHOD, AND STORAGE MEDIUM

(71) Applicant: CANON KABUSHIKI KAISHA, Tokyo (JP)

(72) Inventor: Toshifumi Hamachi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 436 days.

(21) Appl. No.: 15/379,211

(22) Filed: Dec. 14, 2016

(65) Prior Publication Data

US 2017/0180342 A1    Jun. 22, 2017

(30) Foreign Application Priority Data

Dec. 18, 2015 (JP) ................................ 2015-246899

(51) Int. Cl.
| | |
|---|---|
| H04L 29/06 | (2006.01) |
| H04W 76/11 | (2018.01) |
| H04W 12/08 | (2009.01) |
| H04W 12/06 | (2009.01) |
| H04W 24/02 | (2009.01) |
| H04W 84/12 | (2009.01) |
| H04W 88/08 | (2009.01) |

(52) U.S. Cl.
CPC .......... *H04L 63/08* (2013.01); *H04L 63/0428* (2013.01); *H04L 63/06* (2013.01); *H04L 63/20* (2013.01); *H04W 12/06* (2013.01); *H04W 12/08* (2013.01); *H04W 76/11* (2018.02); *H04W 24/02* (2013.01); *H04W 84/12* (2013.01); *H04W 88/08* (2013.01)

(58) Field of Classification Search
CPC . H04W 12/08; H04W 12/06; H04W 12/0608; H04W 12/0609; H04W 12/00; H04W 12/001; H04L 63/08; H04L 63/20; H04L 63/205
See application file for complete search history.

(56) References Cited

U.S. PATENT DOCUMENTS

| | | | |
|---|---|---|---|
| 2002/0061748 A1 | 5/2002 | Nakakita | |
| 2013/0133029 A1* | 5/2013 | Omori | ..................... H04L 63/20 726/1 |
| 2013/0347065 A1* | 12/2013 | Filippi | ................ H04L 63/0272 726/2 |

(Continued)

FOREIGN PATENT DOCUMENTS

| | | |
|---|---|---|
| JP | 2005-311653 A | 11/2005 |
| JP | 2008-213294 A | 9/2008 |

(Continued)

*Primary Examiner* — Edward Zee
(74) *Attorney, Agent, or Firm* — Canon U.S.A., Inc. IP Division

(57) ABSTRACT

A base station includes a reception unit that receives a first communication parameter including first security information and an identifier of a first wireless network established by another base station, a generation unit that generates second security information in which a security method defined in the first security information is changed to a security method having a higher security level, and an establishment unit that establishes a second wireless network that uses a second communication parameter including the identifier and the second security information and has the identifier.

16 Claims, 6 Drawing Sheets

(56) References Cited

U.S. PATENT DOCUMENTS

| | | | |
|---|---|---|---|
| 2014/0250513 A1* | 9/2014 | Cao | H04L 63/08 |
| | | | 726/7 |
| 2016/0095153 A1* | 3/2016 | Chechani | H04W 12/08 |
| | | | 370/338 |
| 2017/0070390 A1* | 3/2017 | Poola | H04L 41/0846 |

FOREIGN PATENT DOCUMENTS

| | | |
|---|---|---|
| JP | 2013-046290 A | 3/2013 |
| JP | 2015-119426 A | 6/2015 |

* cited by examiner

BASE STATION, CONTROL METHOD, AND STORAGE MEDIUM

BACKGROUND

Field

The present disclosure relates to a base station that communicates with a communication device.

Description of the Related Art

When a device is connected to a wireless network, communication parameters, such as an identifier of the wireless network, an encryption method, an authentication method, an encryption key, and an authentication key, need to be set prior to the connection processing. When such communication parameters are manually set, the setting operation thereof can be troublesome.

United States Patent Application Publication No. 2002/0061748 discusses a configuration with which a device receives communication parameters from a base station that establishes a wireless network and sets the received parameter therein. This enables the device to be easily connected to the wireless network.

In a case where an existing base station is replaced with a new base station, there are demands that a wireless network having the same identifier as the existing base station should be established by the new base station so that users can more easily recognize the familiar identifier as a wireless network to be connected. There are also demands that, for the new base station, a wireless network having a higher security level should be established.

Therefore, what is needed is that when a wireless network is established by a second base station, this wireless network have the same identifier of the wireless network established by a first base station, as well a higher security level than the wireless network established by the first base station.

SUMMARY

According to aspects of the embodiments, a base station includes a reception unit configured to receive, from a first communication device, a first communication parameter including first security information and an identifier of a first wireless network established by another base station, a generation unit configured to generate second security information in which a security method defined in the first security information is changed to a security method having a higher security level, and an establishment unit configured to establish a second wireless network that uses a second communication parameter including the identifier and the second security information and has the identifier.

Further features will become apparent from the following description of exemplary embodiments with reference to the attached drawings.

DESCRIPTION OF THE EMBODIMENTS

Hereinbelow, an exemplary embodiment is described with reference to the drawings. The description provides an example case in which a wireless local area network (LAN) system compliant with Institute of Electrical and Electronics Engineers (IEEE) 802.11 series of standards (hereinbelow, referred to as 802.11 standards) is used. However, the present exemplary embodiment is not limited thereto. The present exemplary embodiment can be applied to a wireless LAN system compliant with other wireless communication methods, such as Bluetooth® or ZigBee.

Figure 1:
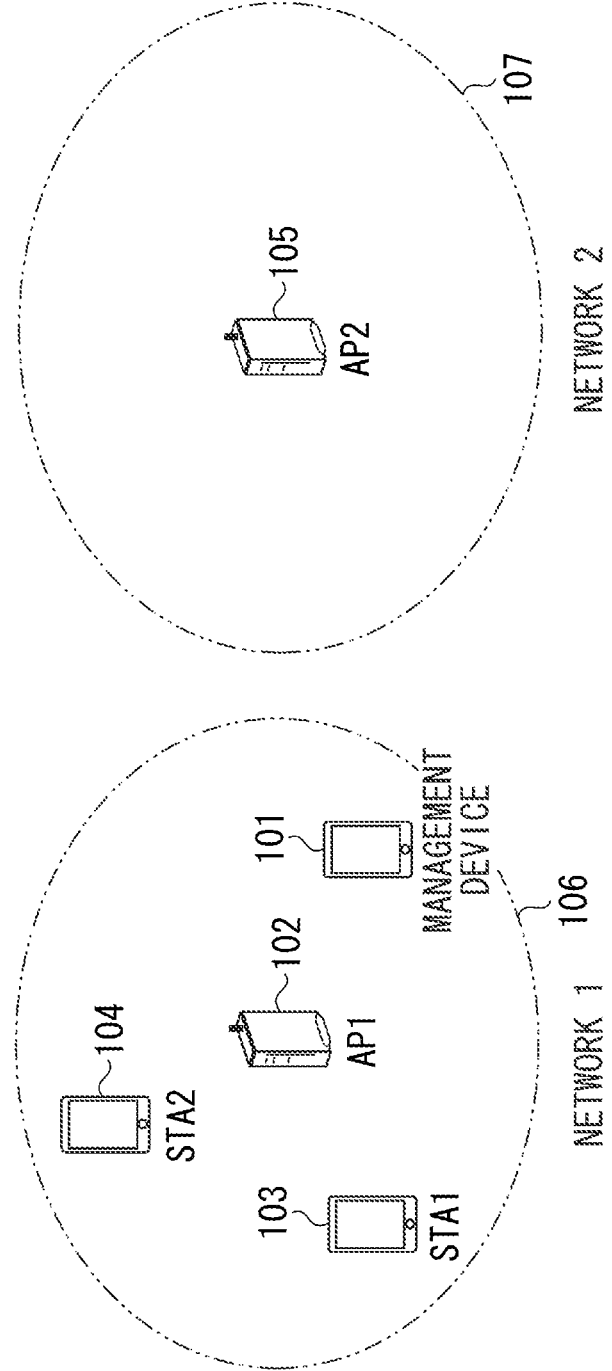
FIG. 1 is a diagram illustrating a wireless network configuration.

FIG. 1 illustrates a network system including a management device 101, a first access point 102 (hereinbelow, referred to as an AP1), a station 103 (hereinbelow, referred to as a STA1), a station 104 (hereinbelow, referred to as a STA2), and a second access point 105 (hereinbelow, referred to as an AP2).

The AP1 is an access point in infrastructure mode defined by the 802.11 standards, and establishes a network 106 (hereinbelow, referred to as a network 1). The AP1 can serve as a Group Owner defined in Wi-Fi® Direct standards to establish the network 1. In other words, the AP1 operates as a base station.

Each of the management device 101, the STA1, and the STA2 operates as a station (terminal device) that is connected to the network 1. The AP2 operates as a base station and establishes a wireless network 107 (hereinbelow referred to as a network 2).

Figure 2:
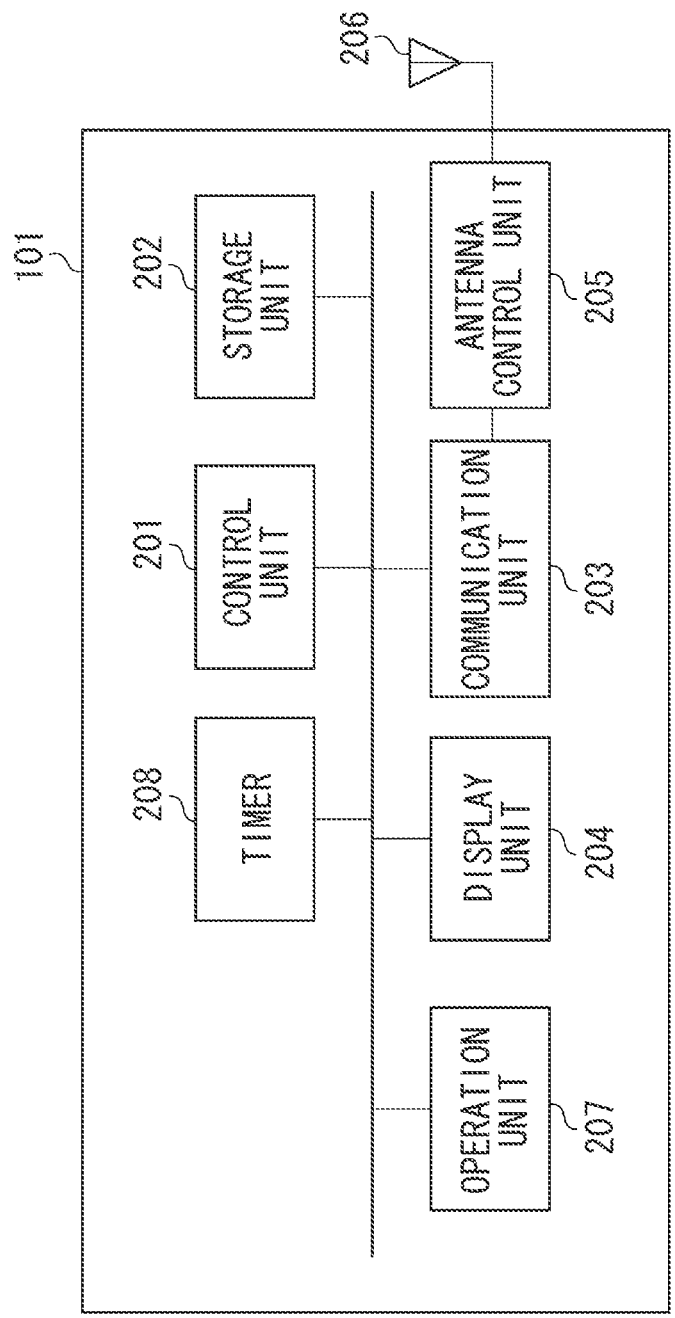
FIG. 2 is a diagram illustrating a hardware configuration of a management device.

FIG. 2 is a diagram illustrating a hardware configuration of the AP2 according to the present exemplary embodiment. Each of the management device 101, the AP1, the STA1, and the STA2 has a hardware configuration similar to that illustrated in FIG. 2.

A control unit 201 includes a central processing unit (CPU) or a micro processing unit (MPU). The control unit 201 executes a program stored in a storage unit 202 to control the AP2. The control unit 201 also performs communication parameter setting processing with other communication devices. The control unit 201 can control the AP2 by cooperating with an operating system (OS) running therein.

The storage unit 202 includes a read only memory (ROM) or a random access memory (RAM). The storage unit 202 stores a program for various operations described below, and for various information, such as communication parameters for wireless communication. Herein, the communication parameters include security information and a wireless network identifier, e.g., a service set identifier (SSID), each of which serves as a parameter for connection to a wireless network. The security information includes information of an encryption method, an encryption key, an authentication method, and an authentication key. The communication parameters can include any one of these parameters.

In addition to a memory such as a ROM and a RAM, a storage medium such as a flexible disk, a hard disk, an optical disk, a magneto-optical disk, a compact disc-read-only memory (CD-ROM), a compact disc recordable (CD-R), a magnetic tape, a non-volatile memory card, and a digital versatile disc (DVD) can be used as the storage unit 202.

A communication unit 203 performs wireless communication compliant with the IEEE 802.11 series of standards.

The communication unit 203 can also include a function of performing short-range wireless communication compliant with near field communication (NFC). A display unit 204 such as a liquid crystal display (LCD) and a light emitting diode (LED) outputs visually recognizable information. The display unit 204 displays, for example, a quick response code (QR Code®) including information necessary for communication parameter setting processing.

The display unit 204 can also serve as a speaker. In such a case, the display unit 204 can output aurally recognizable sounds instead of or in addition to the visually recognizable information. The display unit 204 can also display other two-dimensional codes, such as a communication platform (CP) code, instead of the QR Code®. The display unit 204 can display a one-dimensional code.

An antenna control unit 205 controls an antenna 206. An operation unit 207 receives various inputs from a user so that the user can operate the communication device. A timer 208 detects a lapse of time.

Figure 3:
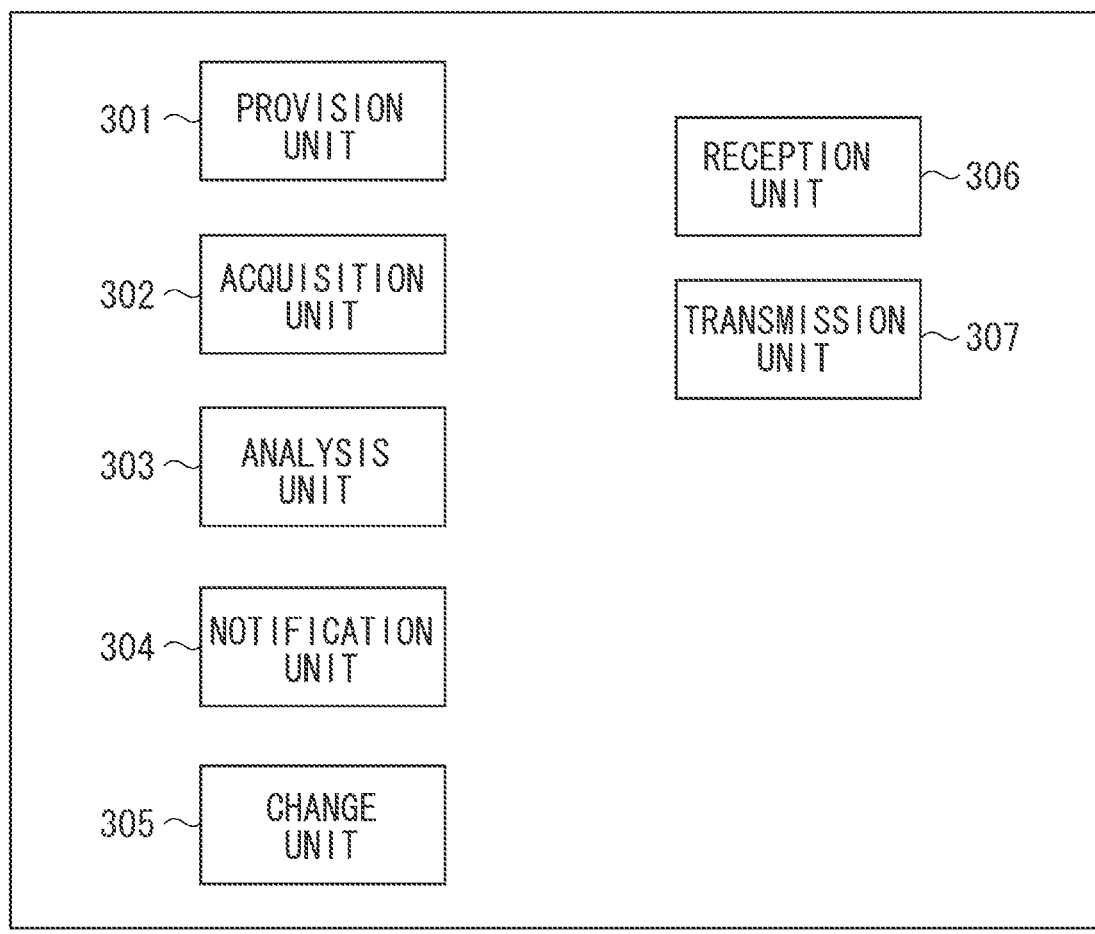
FIG. 3 is a diagram illustrating software function blocks of the management device.

FIG. 3 is a diagram illustrating software function blocks each realized when a control unit of the management device 101 reads a program stored in a storage unit. Alternatively, at least one portion of the software function blocks illustrated in FIG. 3 can be realized by hardware.

For example, one portion of the software function blocks is realized by a predetermined compiler to form a dedicated circuit on a field programmable gate array (FPGA) according to a program for realizing each function block. The formed circuit can then be used as hardware including a function of software modules. Similar to the FPGA, a gate array circuit can be formed to be used as hardware.

A provision unit 301 provides a communication parameter to other communication devices. An acquisition unit 302 acquires the communication parameters from the other communication devices. The management device 101 can perform relay processing in which the communication parameter acquired, by the acquisition unit 302, from one communication device is provided, by the provision unit 301, to a different communication device.

An analysis unit 303 analyzes an image captured by an image capturing unit 209, and extracts identifiers of the other communication devices and authentication information to be used in communication parameter share processing. The identifiers of the other communication devices include, but are not limited to, media access control (MAC) addresses that are unique identifiers of the respective other communication devices or a universally unique identifier (UUID).

The analysis unit 303 analyzes a captured QR Code® image, thereby extracting authentication information or an identifier. The analysis unit 303 can analyze other two-dimensional codes, such as a CP code, or a one-dimensional code instead of the QR Code®.

The analysis unit 303 can acquire authentication information or an identifier by wireless communication according to, for example, NFC, Bluetooth®, ZigBee, IEEE 802.11ad, or TransferJet®, instead of analysis of the image captured by the image capturing unit 209.

A notification unit 304 notifies the other communication devices of a change of the communication parameters. The notification unit 304 also transmits the changed communication parameters to the other communication devices.

A change unit 305 partially or entirely changes the communication parameter acquired from the other communication devices. The change unit 305 determines a parameter to be changed from among parameters included in the communication parameter based on function information of the other communication devices, and then changes the determined parameter.

A reception unit 306 receives a packet, while a transmission unit 307 transmits a packet. Accordingly, the management device 101 performs wireless communication compliant with the IEEE 802.11 standards with the other communication devices.

Figure 4:
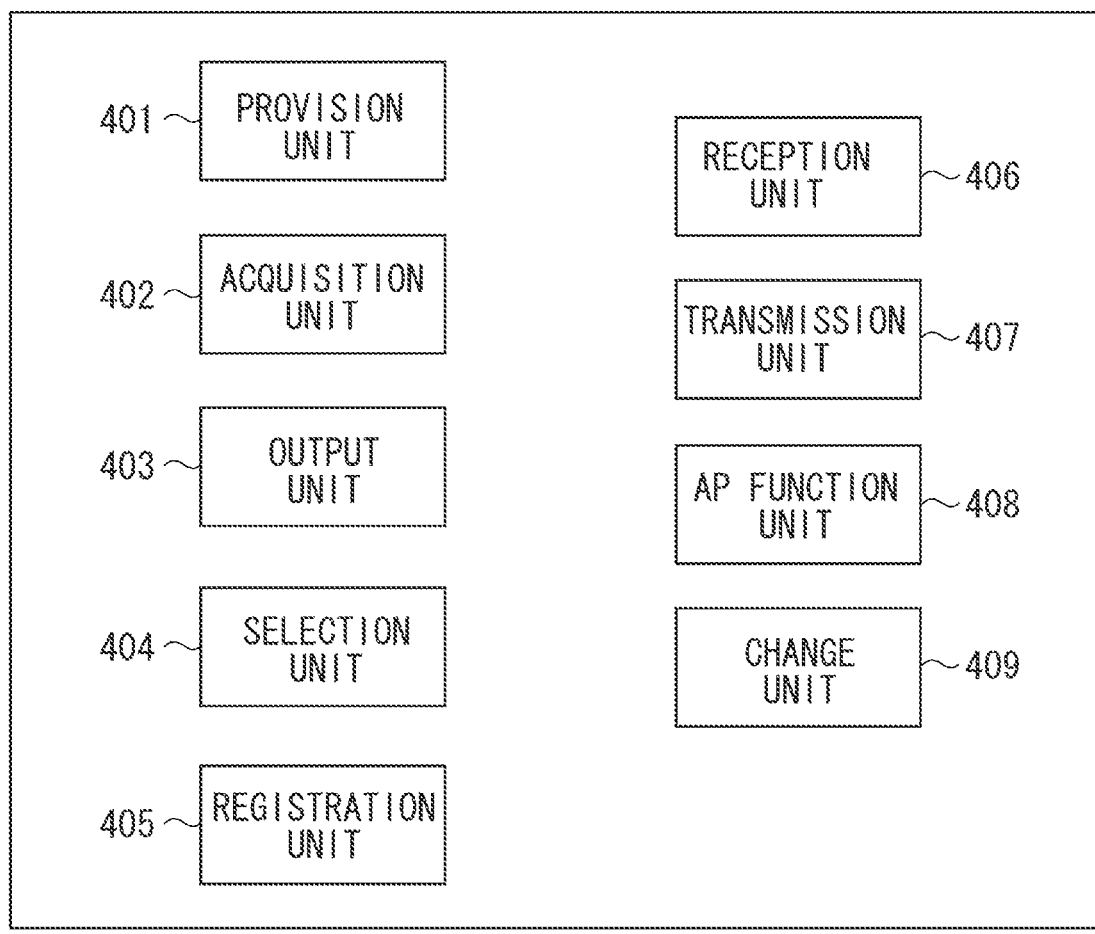
FIG. 4 is a diagram illustrating software function blocks of a base station.

FIG. 4 is a diagram illustrating software function blocks realized when the control unit 201 of the AP2 reads a program stored in the storage unit 202. Similar to the software function blocks described above in FIG. 3, at least one portion of the software function blocks illustrated in FIG. 4 can be realized by hardware. Moreover, the AP1 has software function blocks similar to those illustrated in FIG. 4.

A provision unit 401 provides communication parameters to the other communication devices. An acquisition unit 402 acquires the communication parameter from the management device 101. The acquisition unit 402 also acquires authentication information from the management device 101.

An output unit 403 generates authentication information to be used in communication parameter share processing and a QR Code® including identifier information of the AP2, and outputs the generated authentication information and the generated QR Code® to the display unit 204. The output unit 403 can output other two-dimensional codes, such as a CP code, or a one-dimensional code instead of the QR Code®. The output unit 403 can also output authentication information or an identifier by wireless communication according to, for example, NFC, Bluetooth®, ZigBee, IEEE 802.11ad, or TransferJet® (registered trademark), instead of the output of the QR Code®.

A selection unit 404 selects a communication parameter to be provided to the other communication devices if there is a plurality of communication parameters. A registration unit 405 executes registration processing and deletion processing of the management device. An AP function unit 408 performs a control operation to operate the AP1 as a base station. The AP function unit 408 establishes a wireless network connectable using the communication parameter acquired from the management device 101. The AP function unit 408 also performs maintenance/management of such a wireless network.

A reception unit 406 receives a packet, while a transmission unit 407 transmits a packet. Accordingly, the AP1 performs wireless communication compliant with the IEEE 802.11 standards with the other communication devices. A change unit 409 partially or entirely changes the communication parameters acquired from of the other communication devices.

All of the function blocks are mutually related from a software standpoint or a hardware standpoint. The above function blocks are just one example. A plurality of function blocks can form one function block, or any of the function blocks can be divided into a plurality of blocks for performing a plurality of functions.

In the present exemplary embodiment, the management device 101 reads a QR Code® of the AP2 to acquire authentication information of the AP2. The management device 101 uses the authentication information to perform authentication processing with the AP2. If the authentication succeeds, the management device 101 acquires the management right to set a communication parameter of a wireless network to be established by the AP2, and provides the communication parameter to the AP2. The AP2 establishes the network 2 based on the communication parameter received from the management device 101.

Figure 5:
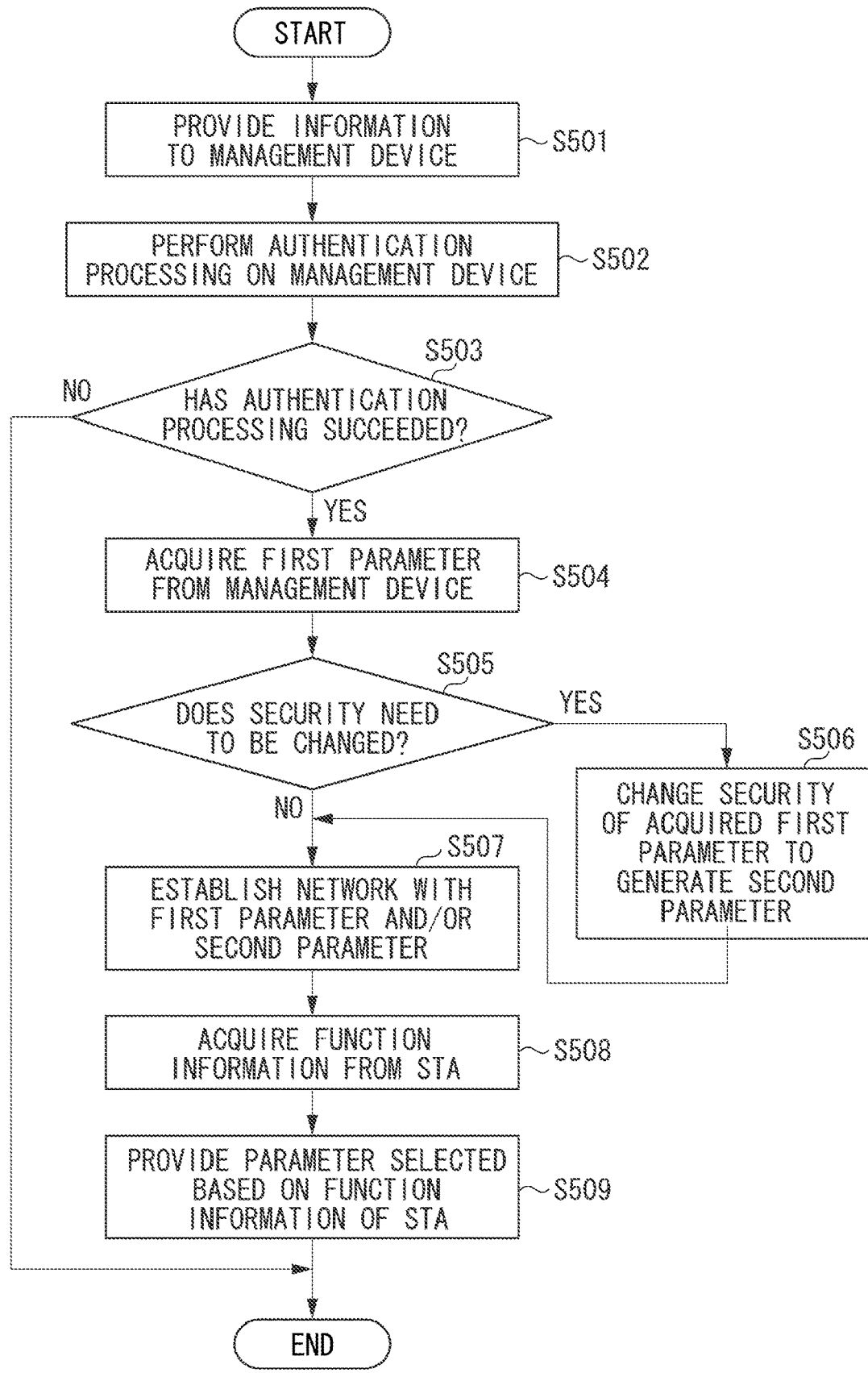
FIG. 5 is a flowchart illustrating processing performed by the base station.

Next, an example case in which an existing base station (AP1) is replaced with a new base station (AP2) is described. FIG. 5 is a flowchart illustrating processing performed by reading a program stored in the storage unit 202 of the AP2 and executing the read program by the control unit 201 when a user issues a predetermined instruction.

At least a part of the processing of the flowchart illustrated in FIG. 5 can be performed by hardware. For example, if the hardware partially performs the processing of the flowchart illustrated in FIG. 5, a predetermined complier can be used to automatically form a dedicated circuit on the FPGA according to the program for realizing each step. Similar to the FPGA, a gate array circuit can be formed to realize each step as hardware. A part of the processing can be realized by an application specific integrated circuit (ASIC).

Figure 6:
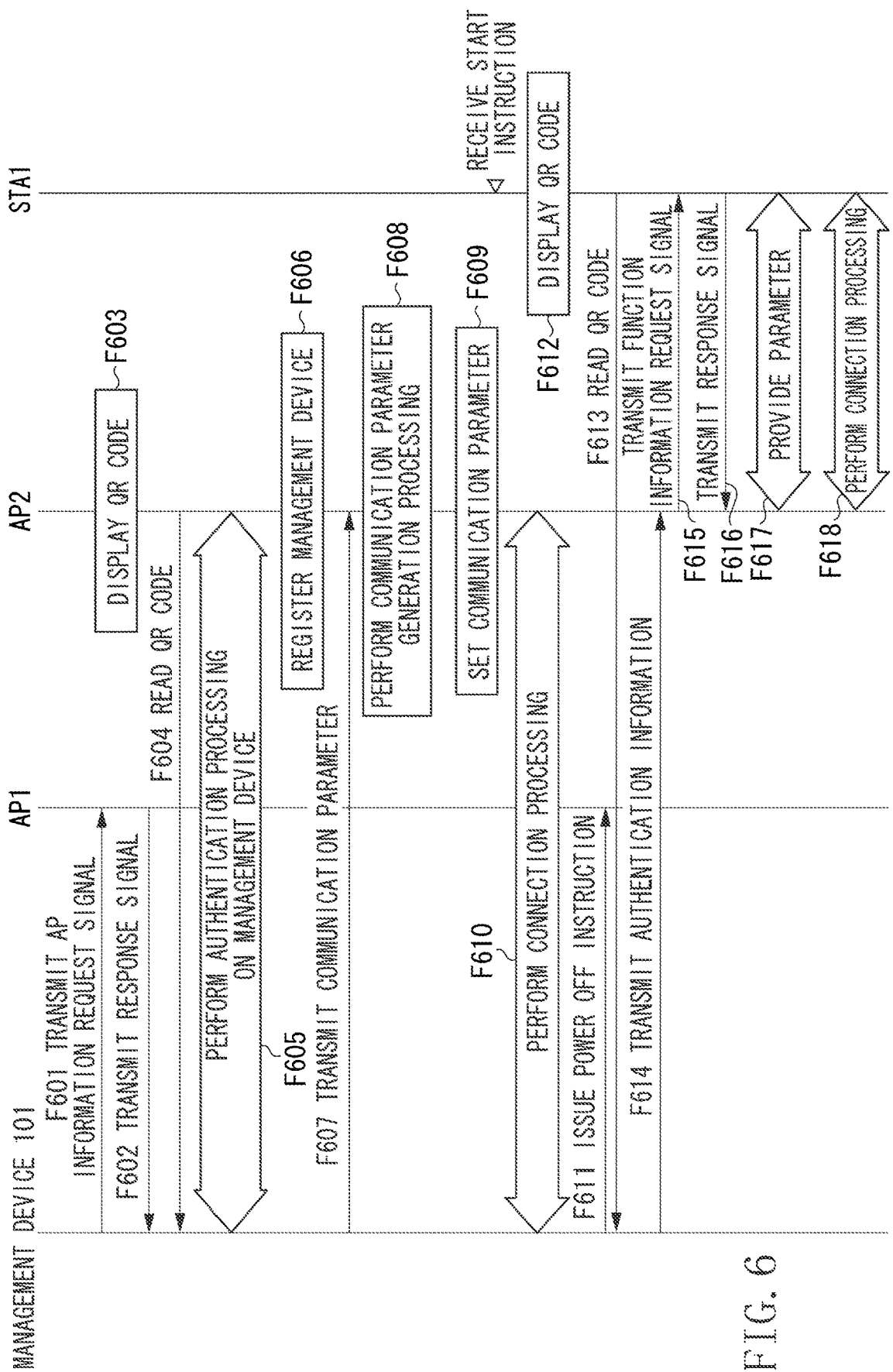
FIG. 6 is a sequence chart.

FIG. 6 is a sequence chart illustrating processing between the management device 101, the AP1, the AP2, and the STA1. Assume that the AP1 has established the network 1, and the management device 101 and the STA1 are connected to the network 1 as an initial state.

First, the management device 101 needs to acquire a communication parameter including an identifier (herein, an SSID) of the wireless network 1. In step F601, the management device 101 transmits an AP information request signal to the AP1. In step F602, upon receiving the request signal, the AP1 transmits a response signal including the communication parameter necessary for connection to the network 1 to the management device 101.

The management device 101 acquires the communication parameter from the AP1 by receiving the response signal. Alternatively, the management device 101 can acquire the communication parameter from the AP1 through data communication according to standards such as hypertext transfer protocol (HTTP) or Wi-Fi® protected setup (WPS).

The management device 101 can also acquire function information about the security of the STA1 while being connected to the AP1. In particular, the management device 101 transmits a function information request signal to the STA1 via the AP1 in a unicast manner. The function information request signal is a packet compliant with universal plug and play (UPnP) or Bonjour.

The function information request signal can be transmitted in a multicast manner or a broadcast manner instead of the unicast manner. The use of the multicast transmission or the broadcast transmission enables responses to be received from a plurality of devices by transmitting one request signal.

Upon receiving the function information request signal, the STA1 transmits a response signal including function information of the STA1 via the AP1. The response signal includes encryption function information indicating whether the STA1 is compliant with advanced encryption standard (AES) or temporal key integrity protocol (TKIP) as an encryption method. The encryption strength of AES is higher than that of TKIP.

The response signal includes authentication function information indicating whether the STA1 is compliant with Wi-Fi® protected access (WPA) 2 or WPA1 as an authentication method. The authentication strength of WPA2 is higher than that of WPA1.

The response signal can include version information of the STA1 as function information. In such a case, an encryption method and an authentication method corresponding to the version information is defined beforehand.

The management device 101 acquires the function information about the security of the STA1 by receiving the response signal from the STA1. The response signal can include information such as a communication method (e.g., IEEE 802.11ac) supported by the STA1, and a frequency band (e.g., 2.4 GHz and 5 GHz) usable by the STA1.

Next, in step S501 illustrated in FIG. 5 and step F603 illustrated in FIG. 6, the AP2 displays the QR Code® including authentication information and public key information of the AP2 on a display unit of the AP2 in response to an operation of a user. Alternatively, a sticker with the QR Code® can be attached to the AP2. The QR Code® sticker can also be attached to an accessory of the AP2, such as an associated instruction manual or shipping packaging. The QR Code® can be written directly on the AP2 or an accessory of the AP2 in place of attaching a sticker.

In step F604, the management device 101 reads the QR Code® of the AP2 via the image capturing unit 209 to acquire the authentication information of the AP2 and the public key of the AP2. Then, in steps S502 and F605, the AP2 performs authentication processing to give the management right to the management device 101.

In the present exemplary embodiment, the management device 101 encrypts the authentication information of the AP2 with the public key of the AP2, and transmits the encrypted data to the AP2. Upon receiving the encrypted data, the AP2 decrypts the encrypted data with a secret key of the AP2 corresponding to the public key. If the authentication information is acquirable by the decryption, it is determined that the authentication has succeeded. This authentication processing enables the AP2 to acquire function information of the management device 101 and the STA1.

If the authentication succeeds (YES in step S503), then in step F606, the AP2 registers the management device 101 as a device having the management right. In step F607, when the authentication processing has succeeded, the management device 101 encrypts the communication parameter (a first parameter) with the public key acquired from the QR Code® of the AP2 and transmits the encrypted communication parameter to the AP2. This can enhance security for transmission of the communication parameter. If the authentication processing fails (NO in step S503), the processing illustrated in FIG. 5 ends. In such a case, the AP2 can notify the use of error.

In step S504, the AP2 receives the first parameter. In step S505, the AP2 determines whether to perform communication parameter generation processing. In step F608, the AP2 performs the communication parameter generation processing, which is described as follows.

In step S505, the AP2 determines whether a security method, i.e., a combination of the authentication method and the encryption method, of the communication parameter acquired from the management device 101 needs to be changed to a method having a higher security level. The AP2 determines whether to change a security level based on at least a part of the function information of the STA1 and the management device 101, and the security method of the acquired communication parameter.

For example, if the security method of the communication parameter is WPA1-TKIP, and the STA1 and the management device 101 are compliant with WPA2-AES, the AP2 determines that the security method of the communication parameter is to be changed to WPA2-AES. If the STA1 or the management device 101 is not compliant with WPA2-AES, the AP2 determines that the security method of the communication parameter is not to be changed. For example, a security method of the communication parameter may be WPA2-AES, and the security may not be enhanced even if the security method is changed. In such a case, the AP2 determines that the security method of the communication parameter is not to be changed.

Such determination can be made without considering the function information of the STA1. In such a case, the AP2 does not need to acquire the function information of the STA1 at the time of authentication processing.

If the AP2 determines that the security method needs to be changed (YES in step S505), the processing proceeds to step S506. In step S506, the AP2 changes the security method of the communication parameter to generate a new communication parameter (a second parameter). Herein, the encryption method is changed from TKIP to AES, and the authentication method is changed from WPA1 to WPA2. For TKIP and AES, if encryption keys having the same length (key length) can be used, the encryption key is not changed. If the same encryption key cannot be used, a new encryption key is generated.

Similarly, if authentication keys having the same length (key length) can be used for WPA1 and WPA2, the authentication key is not changed. If the same authentication key cannot be used, a new authentication key is generated. In step S506, a wireless network identifier is not changed. Therefore, identifier information included in the communication parameter before the change and identifier information included in the communication parameter after the change are the same.

Any one of the encryption method and the authentication method can be changed.

Upon completion of the change of the security method, in steps S507 and F609, the AP2 sets the second parameter as a communication parameter of the wireless network (the network 2) to be established. However, both of the first and the second parameters can be set as the communication parameters of the wireless network.

In the above-described exemplary embodiment, the encryption key or the authentication key is not changed depending on key lengths before and after the change is made. Thus, a terminal that has been connected to the AP1 can be connected to the AP2 without a large change in a setting of the terminal.

If the AP2 determines that the security method does not need to be changed (NO in step S505), the processing proceeds to step S507. In step S507, the AP2 sets the first parameter as a communication parameter of the wireless network (network 2) to be established.

Accordingly, the security method of the AP2 is changed from the security method applied to the AP1 to a method having a higher security level. As a result, data communication can be performed with higher security.

When the communication parameter setting with respect to the AP2 is completed, the processing proceeds to step F610. In step F610, the management device 101 is connected to the AP2. In step F611, the management device 101 issues a power off instruction to the AP1 to turn off the power of the AP1. This can shut down the wireless network 1 established by the AP1. Alternatively, the management device 101 can display an instruction to prompt the user to turn off the power of the AP1 on the display unit 204.

The management device 101 can instruct the AP1 to change the communication parameter instead of the power off. Thus, the wireless network 1 is shut down, or the communication parameter is changed by the AP1. This can prevent a station such as the STA1 from being connected to the old wireless network 1 of the AP1.

Next, the AP2 performs processing for setting the communication parameter in the STA1. Such processing can be omitted if the communication parameter is not changed.

In step F612, upon receiving an instruction to start setting the communication parameter from the user, the STA1 displays the QR Code® including the authentication information of the STA1 on the display unit. The STA1 can also display the QR Code® in response to receipt of a predetermined signal from a device such as the management device 101.

Additional types of two-dimensional codes or a one-dimensional code, such as a barcode, can be displayed instead of the QR Code®. Authentication information can be transmitted via wireless communication according to, for example, NFC, Bluetooth®, ZigBee, IEEE 802.11ad, and TransferJet®, instead of displaying the code.

In step F613, the management device 101 reads the QR Code® of the STA1 to acquire authentication information including public key information of the STA1. In a case where the STA1 displays other codes instead of the QR Code®, the management device 101 can read the other code to acquire authentication information. In a case where the STA1 transmits authentication information by wireless communication instead of the QR Code®, the authentication information can be received through the corresponding wireless communication.

In step F614, the management device 101 transmits the acquired authentication information of the STA1 to the AP2, which triggers the communication parameter share processing between the STA1 and the AP2. In steps S508, F615, and F616, the AP2 acquires the function information from the STA1 in response to the trigger for the communication parameter share processing from the management device 101.

Next, the AP2 uses the received authentication information of the STA1 to execute the communication parameter share processing with the STA1. In steps S509 and F617, the AP2 determines which of the first parameter or the second parameter is to be provided based on the function information of the STP1, and provides the resultant parameter to the STA1. In addition, the communication parameter is encrypted with the public key of the STA1, which is included in the authentication information, and then transmitted to the STA1. This can also enhance security when the communication parameter is shared.

In step F618, upon receiving the communication parameter, the STA1 is connected to the AP2 so that data communication can be performed. Since the security method of the AP2 is changed from the security method applied to the AP1 to a higher-security method, data communication can be performed with higher security.

According to the present exemplary embodiment, as described above, when the AP1 is replaced with the AP2, the AP2 can easily establish the wireless network 2 having an identifier of the wireless network 1 established by the AP1.

Since the security method of the communication parameter is automatically changed to a method having a higher security level, security and user convenience are enhanced. A security method is selected within a range that can be dealt with by APs and STAs. This can prevent degradation in connectivity due to a change of the security method.

In the above-described exemplary embodiment, if the AP2 is not compliant with a predetermined security method (e.g., AES), the management device 101 can end the processing illustrated in FIG. 5 as an error. This can reduce the possibility of establishment of a new network having low security.

In the above-described exemplary embodiment, the management device 101 sets a changed communication parameter to the AP2. However, in a case where a plurality of networks can be concurrently established by the AP2, the management device 101 can set both of first and second parameters.

In this case, a wireless network substantially the same as the network 1 is established by the AP2, thereby enhancing connectivity. Alternatively, if a STA is connected to the network 2 with a setting of the first parameter, the second parameter is provided from the AP2 to the STA using data communication according to standards such as HTTP to facilitate the replacement of the setting by a setting of the second parameter. In a case where there is no STA to be connected to one of wireless networks for a predetermined time period, the AP2 can shut down the wireless network. This can prevent the security from being lowered.

The exemplary embodiment can also be realized by processing in which a program for realizing one or more functions of the above-described exemplary embodiment is supplied to a system or a device via a network or a storage medium, and one or more processors in a computer of such a system or device reads and executes the program. The exemplary embodiment can also be realized by a circuit (e.g., ASIC) for realizing one or more functions.

According to the exemplary embodiment, a wireless network with a higher security level that also retains an identifier of a wireless network established by a first base station can be easily established by a second base station.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-246899, filed Dec. 18, 2015, which is hereby incorporated by reference herein in its entirety.

What is claimed is:

1. A base station comprising:
   a reception unit configured to receive, from a first communication device, a first communication parameter including first security information and an identifier of a first wireless network established by another base station;
   a generation unit configured to generate second security information in which a security method defined in the first security information is changed to a security method having a higher security level than that of the first security information;
   an establishment unit configured to establish a second wireless network that uses a second communication parameter including the identifier and the second security information and has the identifier; and
   a providing unit configured to, based on notification from the first communication device, provide a second communication device that is different from the first communication device with the second communication parameter.

2. The base station according to claim 1, further comprising an authentication unit configured to authenticate the first communication device,
   wherein, in a case where the authentication succeeds, the reception unit receives the first communication parameter from the first communication device.

3. The base station according to claim 2, further comprising a display unit configured to display authentication information used to authenticate the first communication device,
   wherein the authentication unit authenticates the first communication device based on the authentication information received from the first communication device.

4. The base station according to claim 3, wherein the display unit displays a one-dimensional code or a two-dimensional code including the authentication information.

5. The base station according to claim 1, wherein the establishment unit establishes the second wireless network that uses the second communication parameter and a third wireless network that uses the first communication parameter.

6. The base station according to claim 1, further comprising:
   an acquisition unit configured to acquire function information of the second communication device;
   a selection unit configured to, based on the function information, select which of the first communication parameter and the second communication parameter to provide to the second communication device; and
   a provision unit configured to provide the selected communication parameter to the second communication device.

7. The base station according to claim 1, wherein the first security information and the second security information includes at least an encryption method, an authentication method, an encryption key, or an authentication key.

8. The base station according to claim 1, wherein the second wireless network is a network performing wireless communication compliant with IEEE 802.11 series of standards.

9. The base station according to claim 1, wherein the base station is an access point in infrastructure mode defined in IEEE 802.11 series of standards.

10. The base station according to claim 1, wherein the base station is a Group Owner defined in Wi-Fi® Direct standards.

11. The base station according to claim 1, wherein the generation unit generates the second security information in which an encryption method defined in the first security information is changed to an encryption method having a higher encryption level.

12. The base station according to claim 1, wherein the generation unit generates, based on the first security information that uses temporal key integrity protocol, the second security information that uses advanced encryption standard.

13. The base station according to claim 1, wherein the generation unit generates the second security information in which an authentication method defined in the first security information is changed to an authentication method having a higher authentication level.

14. The base station according to claim 1, wherein the generation unit generates, based on the first security information that uses Wi-Fi® protected access 1, the second security information that uses Wi-Fi® protected access 2.

15. A method enabling a base station to establish a wireless network, the method comprising:

receiving, from a first communication device, a first communication parameter including first security information and an identifier of a first wireless network established by another base station;

generating second security information in which a security method defined in the first security information is changed to a security method having a higher security level than that of the first security information;

establishing a second wireless network that uses a second communication parameter including the identifier and the second security information and has the identifier; and providing, based on notification from the first communication device, a second communication device that is different from the first communication device with the second communication parameter.

16. A non-transitory computer readable storage medium storing computer executable instructions for causing a computer to execute the steps of a method enabling a base station to establish a wireless network, the method comprising:

receiving, from a first communication device, a first communication parameter including first security information and an identifier of a first wireless network established by another base station;

generating second security information in which a security method defined in the first security information is changed to a security method having a higher security level than that of the first security information;

establishing a second wireless network that uses a second communication parameter including the identifier and the second security information and has the identifier; and providing, based on notification from the first communication device, a second communication device that is different from the first communication device with the second communication parameter.

* * * * *